United States Patent [19]

Matijevic

[11] Patent Number: 5,015,452

[45] Date of Patent: May 14, 1991

[54] PROCESS FOR SYNTHESIS OF UNIFORM COLLOIDAL PARTICLES OF RARE EARTH OXIDES

[75] Inventor: Egon Matijevic, Potsdam, N.Y.

[73] Assignee: Clarkson University, Potsdam, N.Y.

[21] Appl. No.: 3,900

[22] Filed: Jan. 16, 1987

Related U.S. Application Data

[63] Continuation-in-part of Ser. No. 931,352, Nov. 17, 1986, abandoned.

[51] Int. Cl.$^5$ .............................................. C01F 17/00
[52] U.S. Cl. .................................... 423/263; 423/211; 423/592; 252/301.36; 252/301.4 R
[58] Field of Search ................... 423/263, 21.1, 592; 252/301.4 R, 301.36; 210/912; 501/152

[56] References Cited

U.S. PATENT DOCUMENTS

| | | | |
|---|---|---|---|
| 3,669,897 | 6/1972 | Wachtel | 423/263 |
| 4,010,242 | 3/1977 | Iler et al. | 423/592 |
| 4,263,164 | 4/1981 | Swinkels et al. | 423/263 |
| 4,529,410 | 7/1985 | Khabdji et al. | 423/263 |

FOREIGN PATENT DOCUMENTS

| | | | |
|---|---|---|---|
| 0167426 | 10/1983 | Japan | 423/263 |
| 0013625 | 1/1984 | Japan | 423/263 |
| 1000532 | 1/1986 | Japan | 423/263 |

OTHER PUBLICATIONS

"Aluminum Hydrous Oxide Sols", Catone et al., Journal of Colloid and Interface Science, vol. 48, No. 2, Aug. 8, 1974, pp. 291-301.

Monodispersed Metal(hydrous)Oxides-Matijević, American Chemical Society, 1981, 14, 22-29.
Matijevic, E., "Monodispersed Colloids: Art and Science", 1986, pp. 12-20.
Kirk-Othmer, "Rare Earth Elements", 1986, pp. 150-167.
Matijevic, E., "Production of Monodispersed Colloidal Particles", 1985, pp. 483-516.

*Primary Examiner*—Robert L. Stoll
*Assistant Examiner*—Paige C. Harvey
*Attorney, Agent, or Firm*—Oblon, Fisher, Spivak, McClelland & Maier

[57] ABSTRACT

An improved process for the preparation of monodispersed spherical colloidal particles from rare earth salts is disclosed. These colloidal particles are obtained in this process by homogeneous precipitation techniques involving the forced hydrolysis of rare earth salts in aqueous media. More specifically, this process initially involves the formation of hydrolyzed cations which are precursors or intermediate to precipitation of the desired colloidal particle. The objective in the formation of this precursor species is to reach critical supersaturation concentration of this particle forming species so that only one burst of nuclei occurs. Colloidal particle formation is then effected by diffusion of solutes onto the existing nuclei. The improvements of this process reside, in part, in the ability to control the kinetics of formation of this intermediate species. Such control permits the formation of colloidal dispersions having very narrow particle size distribution. The colloidal dispersions of these particles are also quite stable. The rare earth colloidal particles prepared by this process are useful in both industrial and biologic environments.

9 Claims, 5 Drawing Sheets a b

PROCESS FOR SYNTHESIS OF UNIFORM COLLOIDAL PARTICLES OF RARE EARTH OXIDES

GOVERNMENT CONTRACT

The inventions described and claimed herein were made under a grant from the U.S. Air Force Office of Scientific Research (AFOSR Contract F49620-85-C-0142) and the United States Government has rights in such inventions.

CROSS REFERENCE TO RELATED APPLICATION

This application is a continuation-in part of U.S. application Ser. No. 931,352, filed Nov. 17, 1986, entitled Process for Synthesis of Uniform Colloidal Particles of Rare Earth Oxides, now abandoned.

BACKGROUND OF THE INVENTION

1. Field of the Invention

This invention relates to a process and to a composition of matter resulting from this process. More specifically, this invention is directed to processes for the preparation of spherical colloidal particles of rare earth (hydrous) oxides. The particles produced in accordance with these processes have a very narrow particles size distribution and well defined morphology. These particles have advantageous optical properties (i.e. fluorescence) and are, thus, useful in diagnostic applications in the optical separation of various constituents of complex fluids (i.e. blood, cerebrospinal fluid or urine).

2. Description of the Prior Art

The preparation of colloidal particles from organic substances has, until very recently, been a highly empirical "science". For the most part, the efficacy of such processes was quite subjective and generally the relative success or failure thereof required laborious trial and error in order to attain adequate process definition. More specifically, the efficacy of a particular technique, even if it were reproducible to a degree, rarely produced a consistently acceptable product. The inability to achieve reproducible results from such processes has, thus, led many to regard the synthesis of inorganic colloidal particles as largely the domain of the empiricist.

With the advent of more sophisticated analytical tools (i.e. electron microscopy), the fascination with inorganic colloidal particles, and more particularly, monodispersed inorganic colloidal particles, has been rekindled. The initial interest in such materials was primarily as a scientific curiosity, however, more recent developments have found them useful as supports for catalysts, in ceramics, pigments, films, recording media, coatings, in various diagnostic and therapeutic environments, as well as a myriad of other applications.

The term "monodispersed" as used in the discussion of the prior art and throughout the balance of this disclosure is intended as referring to a population of particulate materials having a narrow particles size distribution.

A survey of the various techniques for synthesis of monodispersed, inorganic colloidal particles has recently appeared in the technical literature, see Matijevic, E., "Monodispersed Colloids: Art and Science", Langmuir, Vol. 2, No. 1, pp. 12-20 (1986).

The procedures which have been developed by the inventor for synthesis of inorganic colloidal dispersions of narrow particle size distribution have been described in detail in a number of papers which have also appeared in the technical literature, see for example, Matijevic, E., Annu. Rev. Mater. Sci. (1985), 15, 483 and Matijevic, E., Acc. Chem. Res. (1981), 14, 22. Two of the procedures described in the above articles can be conveniently grouped into the following categories: (1) precipitation from homogeneous solution (i.e. forced hydrolysis, controlled release of anions and controlled release of cations); and (2) phase transformations. What is, however, to be appreciated is that each of the above procedures will have one or more shortcomings or advantages for synthesis of a specific colloidal material. Thus, the production of an acceptable product in accordance with each of the processes from the same starting materials is highly unpredictable. More specifically, in order to produce colloidal particles of specific characteristics, both of the above procedures may have to be attempted before one can be identified as potentially useful or efficacious. At that point, additional refinement will be required before an acceptable product is attainable.

In the procedures involving precipitation of inorganic compounds from homogeneous solutions, the precursors to the formation of the solid phase are, in most instances, one or more solute complexes. This procedure is, thus, based upon the control of kinetics of the complexation reaction in order to achieve a single burst of nuclei, which are then allowed to grow uniformly, resulting in particles of narrow size distribution. Where the constituent solutes are generated at the proper rate, their even distribution onto existing nuclei results in the least increase in total free energy of the dispersion, thus, controlling the growth of such particles by proper control of particle charge. Control of the charge in such particles is traditionally achieved by adjustment in pH or through the introduction of additives. In the absence of such control in charge, aggregation of such particles will result.

The phrase "forced hydrolysis" is used hereinafter to reference the process or ability of many hydrated metal ions (especially polyvalent metal cations) to readily deprotonate in aqueous solution at elevated temperatures. This characteristic can be used to advantage in the preparation of colloidal particles from such materials. Since the hydrolyzed species of these metal ions are intermediates to precipitation of the corresponding hydroxides, it is possible to generate uniform particles simply by heating metal salt solutions. In this forced hydrolysis procedure, the pH and the nature of the anions play a dominant role. In some instances, anions may simply affect particle morphology without being integrated within the solid phase, or can be incorporated within the solid phase as impurities into either an amorphous or crystalline solid. Lastly, these anions can through stoichiometric compounds, as in the case of alunites.

Because of the nature of the colloidal particles, and the various methods used in their preparation, their physical properties are often unpredictable. More specifically, the preparation of colloidal particles from rare earth oxides by traditional methods did not permit the attainment of particles of predictable morphology or uniform size.

The traditional procedures for the synthesis of rare earth oxides are both diverse and energy intensive (Kirk and Othmer, Encyclopedia of Chemical Technology, (2nd Ed), Vol. 17, 163). The so-called "dry" approach to such synthesis involves the initial formation of salts (i.e., hydroxide, carbonate, oxalate, nitrate, sulfate, etc.). These salts can be converted to the corresponding oxide by standard calcination techniques (at temperatures in excess of 850° C.). These salts are, thus, decomposed to the corresponding oxides which are essentially insoluble in aqueous media.

The rare earth oxides produced in the above manner have had rather limited applications, and then primarily in industrial environments. Rare earth compounds, including rare earth oxides, have been mainly used in glass manufacturing and polishing, arc carbons, catalysts, lighter flints, and in ceramic applications.

The adaptation of colloidal materials to biological environment introduces a unique set of variables. For examples, if a colloidal material is to be used in a fluid environment, its ability to form stable dispersions can be critical. In the event the colloidal material is to be used as an indicator or a label, the photo-optical or magnetic properties may be of paramount importance. Colloidal particles are attractive for biological applications because they are relatively inert and can be produced in quantity from readily available materials at relatively low cost. Unfortunately, the inability to prepare such materials in a reproducible manner, with predictable properties, has hindered their general acceptance. Accordingly, there is a continuing need to provide a cost efficient reproducible process for the synthesis of inert, inorganic colloidal particles.

OBJECTS OF THE INVENTION

It is the principle object of this invention to remedy the above as well as related deficiencies in the prior art.

It is another object of this invention to provide a reproducible energy efficient process for the synthesis of monodispersed rare earth (hydrous) oxide particles.

It is yet another object of this invention to provide a reproducible, energy efficient process for the synthesis of colloidal particles of rare earth (hydrous) oxides by an improved forced hydrolysis process.

It is still yet another object of this invention to provide a reproducible, energy efficient, process for the synthesis of a class of rare earth (hydrous) oxides which can be useful in the identification of constituents of complex fluids, notably, biological fluids.

It is a further object of this invention to provide a reproducible, energy efficient process for the synthesis of a class of rare earth (hydrous) oxides whose fluorescent properties can be tailored to the optical separation and identification of constituents of biological fluids.

It is yet a further object of this invention to provide a reproducible, energy efficient process for the synthesis of rare earth (hydrous) oxides which can form stable dispersions in aqueous media.

It is still yet a further object of this invention to provide a reproducible, energy efficient process for the synthesis of rare earth (hydrous) oxides of gadolinium, terbium and europium.

SUMMARY OF THE INVENTION

The above and related objects are achieved by providing a process for the preparation of colloidal dispersions of rare earth (hydrous) oxides from their corresponding salts. The particles produced by this process have well defined morphological properties and are of essentially uniform particle size. This process involves the forced hydrolysis of such salts in aqueous solution under conditions which initially results in the formation of an intermediate or precursor species. The forced hydrolysis of the rare earth salts in accordance with this process is achieved by heating solutions of these salts under deprotonation conditions; most preferably, in the presence of a compound which affords for controlled release of hydroxide ions, i.e. an organic compound such as urea. The deprotonation conditions of this invention permit precise control of the kinetics of formation of a precursor species which are intermediates in the formation nuclei of the desired colloidal particle. The conditions and relative concentration of reactants involved in the formation of the individual precursor species for a specific rare earth colloid will, however, vary somewhat from material, and the stability in formation of each such precursor must be established by experimentation.

In the preferred embodiments of the process of this invention, such forced hydrolysis is effected in aqueous media and in the presence of a source of hydroxide ions (i.e. organic base). This preferred embodiment of the process of this invention is also conservative of energy and can be performed with standard equipment under relatively mild operating conditions. The intermediate or precursor is formed under conditions, and in sufficient concentration, to supersaturate the reaction medium. At or slightly above this point of supersaturation, a single burst of nuclei occurs, thus, initiating growth. Particle growth then proceeds by diffusion of solute from the medium onto the existing nuclei.

The particles recovered from the fluid medium comprise the hydroxycarbonate of the corresponding rare earth salt. The hydroxycarbonate particles can be readily converted to the corresponding oxide by thermal decomposition. This decomposition of the hydroxycarbonate to the oxide does not materially alter the morphology or photo-optical properties of these particles.

The rare earth (hydrous) oxides obtained by this process will vary in physical characteristics and crystallinity, depending upon their chemical composition. The preferred gadolinium oxides of this invention are, for example, generally spherical in shape. These oxides are fluorescent and can be used in biological environments as indicators.

DESCRIPTION OF THE INVENTION INCLUDING PREFERRED EMBODIMENTS

This invention provides a reproducible process for the synthesis of spherical colloidal particles having narrow particle size distribution from rare earth salts (e.g. gadolinium, terbium and europium). These colloidal particles are obtained by homogeneous precipitation techniques involving the forced hydrolysis of rare earth slats in aqueous media. The conditions prevailing in this process are designed to insure control in the kinetics of formation of the species which are precursors to particle growth. This process permits the growth of colloidal particles from such salts in a controlled manner, thus, insuring narrow particle size distribution.

Preliminary to further discussion of this process, it would be helpful to briefly define some of the terms and phrases used throughout this description and in the appended claims.

The phrase "colloidal particles" is intended, in the context of this invention, as inclusive of the hydroxycarbonates and oxides of rare earths having a particle size of less than one (1) micron. It is also understood to be inclusive of colloidal particle mixtures of hydroxycarbonates and oxides of rare earths.

The phrase "rare earth" is intended as descriptive of the lanthanide series of elements of the periodic table having an atomic number of from 57 to 71. This phrase, thus, contemplates the following elements:

Lanthanum (La)
Cerium (Ce)
Praseodymium (Pr)
Neodymium (Nd)
Promethium (Pm)
Samarium (Sm)
Europium (Eu)
Gadolinium (Gd)
Terbium (Tb)
Dysprosium (Dy)
Holmium (Ho)
Erbium (Er)
Thulium (Tm)
Ytterbium (Yb)
Lutetium (Lu)

The salts of the rare earths which are preferred for use in this process include the halide and nitrate salts.

These rare earth salts are readily soluble and can be dissolved in aqueous medium (preferably water). The concentration of these salts in such solutions is precisely adjusted within the following limits: $1 \times 10^{-3}$ mol $dm^{-3}$ to $2 \times 10^{-2}$ mol $dm^{-3}$. Once these salts (polyvalent cations) dissolve in aqueous media, they readily hydrolyze. In the preferred embodiments of the process of this invention, the rare earth salts are combined in aqueous solution with a source of hydroxide ions. The solution containing the hydrated form of the salt can then be heated in the manner consistent with deprotonation of the hydrated form of the salt. The interaction of the hydrated salt and hydroxide ion result in an accelerated deprotonation of coordinated water molecules associated with the metal salt. The source of hydroxide ions which is suitable for use in this process is preferably an organic compound, such as urea, which undergoes a controlled release of hydroxide ions within the temperature range conducive to the deprotonation of the hydrated form of the metal salt.

In the preferred embodiments of this invention, the deprotonation of the hydrated rare earth cation is effected within a temperature range of from about 70° to about 90° C. The temperature which is selected is critical in that is will control not only the kinetics of formation of a precursor or intermediate species, but also the rate of release of hydroxide ion.

The pH of the aqueous media is initially adjusted within the range of from about 4.5 to 6, depending upon the specific rare earth salt from which the colloidal particles which are to be prepared. Buffering of the solution is avoided in order to prevent particle aggregation in systems of such high ionic strength. As the solution ages, the pH will turn decidedly more acidic. As discussed later in another context, the relative acidity of the aqueous media can affect the rate of generation of the colloidal particle, their particle size and particle size distribution.

The kinetics of formation of the precursor or intermediate species is a critical feature of the process of this invention. The deprotonation of the hydrated rare earth cations proceeds at a controlled rate at the temperature and pH specified in this process. The concurrent generation of hydroxide ions within the reaction mass accelerates this deprotonation process consistent with the controlled formation of this precursor species. The objective to this process further require that the deprotonation of the hydrate rare earth cations results in the formation of sufficient precursor species to reach critical supersaturation concentration. At this point, only a single burst of nuclei is formed, and particle growth thereupon proceeds by diffusion of solutes onto these existing nuclei. By controlling the kinetics of formation of this intermediate species, only one burst of nuclei occurs and, thus, particle size distribution is accordingly controlled. Where, for example, repeated nucleation is allowed to occur sporadically over a finite interval, particle size distribution would broaden dramatically. By controlling the kinetics of formation of the precursor of the nuclei, it is also possible to produce a stable dispersion of colloidal particle of rare earth salts having narrow particle size distribution. The process of this invention, thus, provides a unique pathway for synthesis of a dispersion of colloidal particles of narrow particle size distribution.

The chemical composition of the colloidal particles was quite predictable. The salts of gadolinium, terbium, europium and samarium consistently produced colloidal particles of the corresponding hydroxycarbonate. The chemical composition of the colloidal particles reflected not only the processing history, but also the presence of additives in the reaction medium. Thus, the presence of carbonate in the particle was neither unexpected, nor inconsistent with the objectives of this process (namely, the synthesis of the corresponding hydrous oxide). These hydroxycarbonates were readily convertible to the corresponding oxides by heating these hydroxycarbonate particles under conditions conducive to thermal decomposition (i.e. oxidizing atmosphere and temperatures in the range from about 600° to 850° C.). This conversion did not otherwise change the essential morphological characteristics or properties of these colloidal materials.

In certain instances, the colloidal particles prepared in accordance with this process were essentially spherical in shape and amorphous (i.e. gadolinium hydroxycaronate). These gadolinium particles are also fluorescent and are compatible for use with complex biological fluids. For certain applications, it may be desirable to subject such particles to calcination at elevated temperature (e.g. 600°-850° C.). This calcination process resulted in the controlled decomposition of the hydroxycarbonate to the corresponding oxide and a phase transformation of the amorphous hydroxycarbonate particles to crystalline oxide particles, without otherwise alteration of the particles gross morphological characteristics.

The process of this invention also surprisingly lends itself to a continuous flow synthesis of colloidal particles from rare earth salts. The continuous flow approach to such synthesis enables achievement of anticipated efficiencies over the more traditional batch ("dry") manufacturing techniques.

Figure 1:
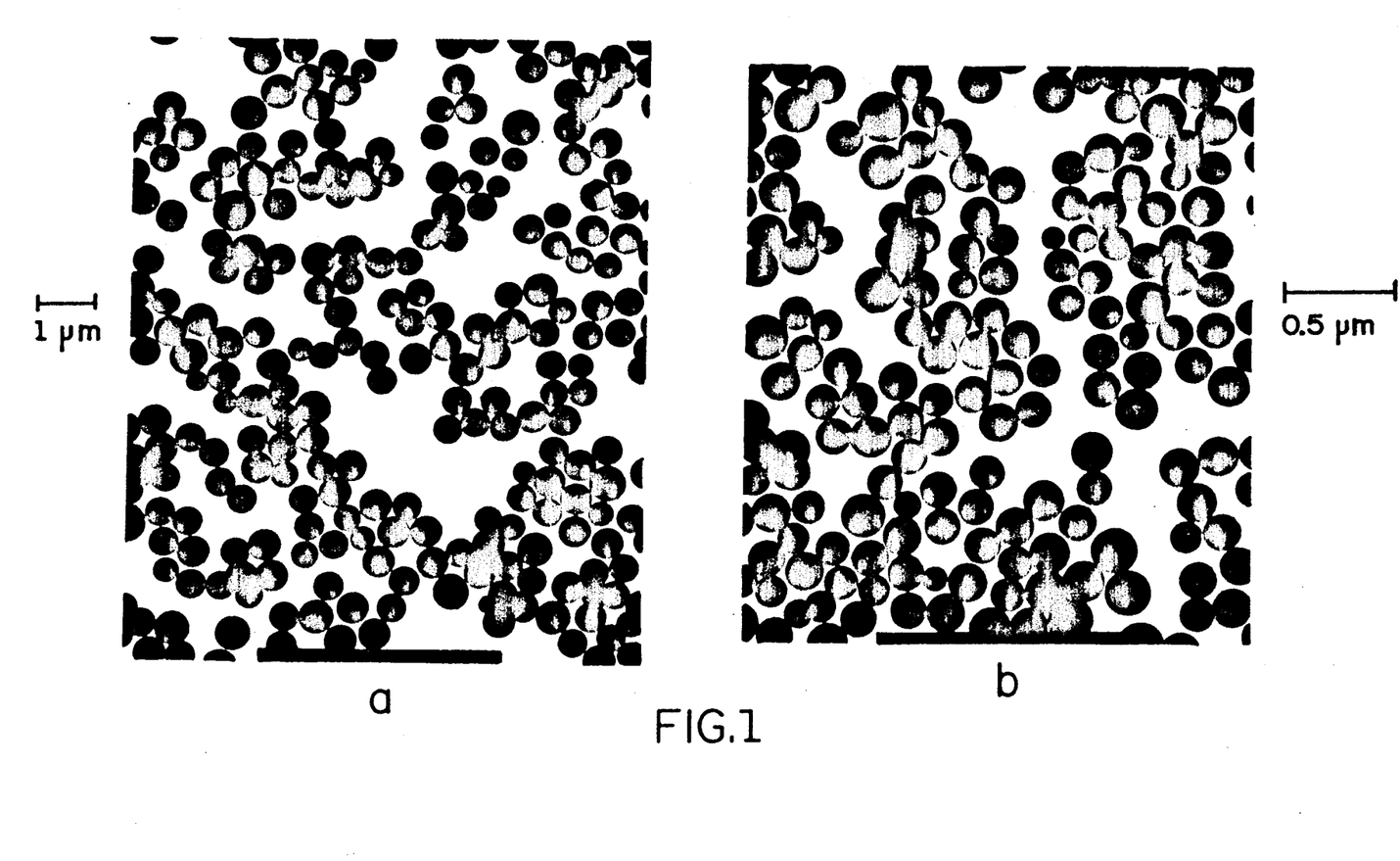
FIGS. 1a and 1b are pen and ink reproductions of transmission electron micrographs of the gandolinium hydroxycarbonate particles of Example 1a and 1b respectively.
Figure 2:
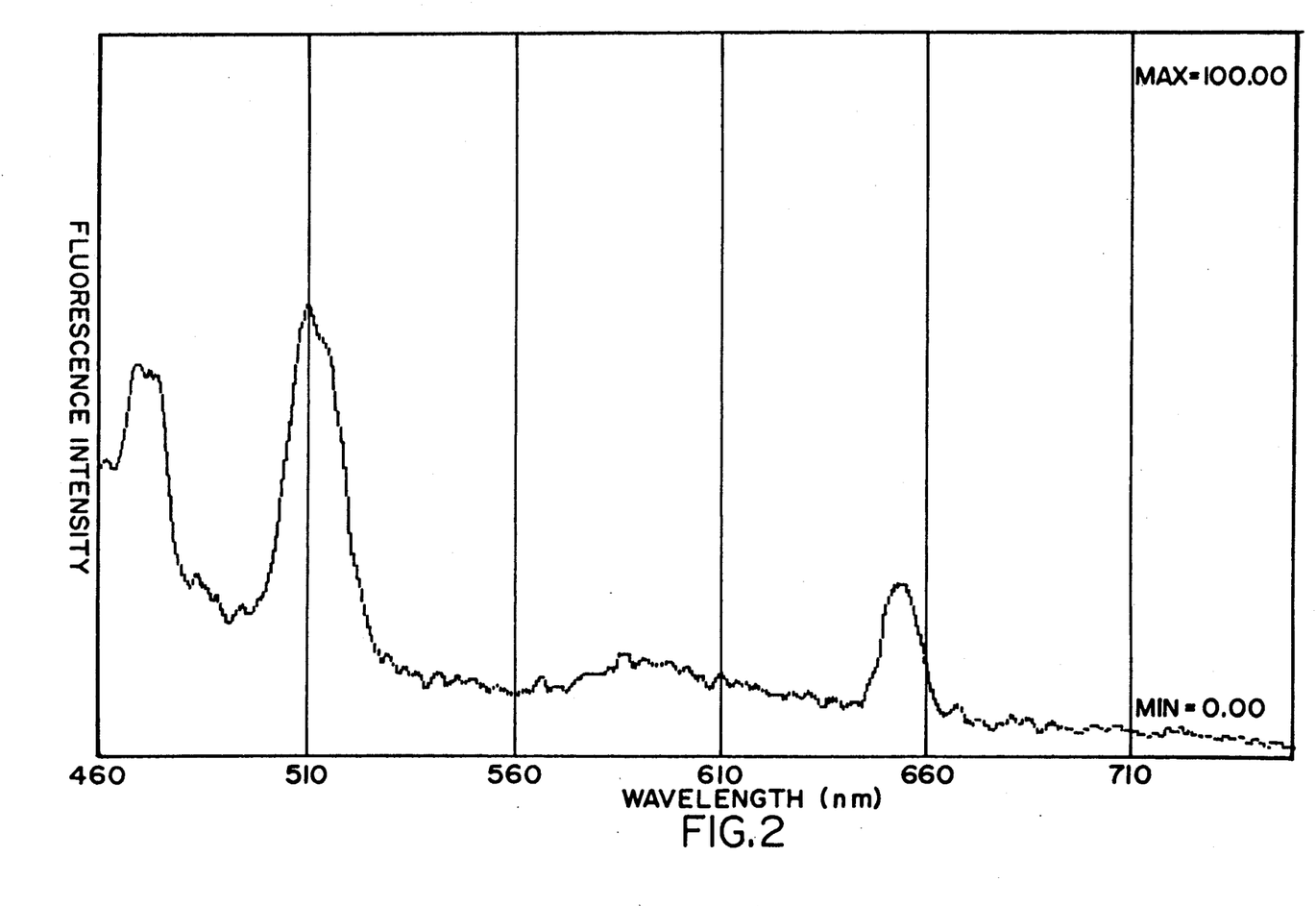
FIG. 2 is a fluorescence emission spectrum of the gadolinium hydroxycarbonate of Example 1 at 436 nm excitation wavelength.
Figure 3:
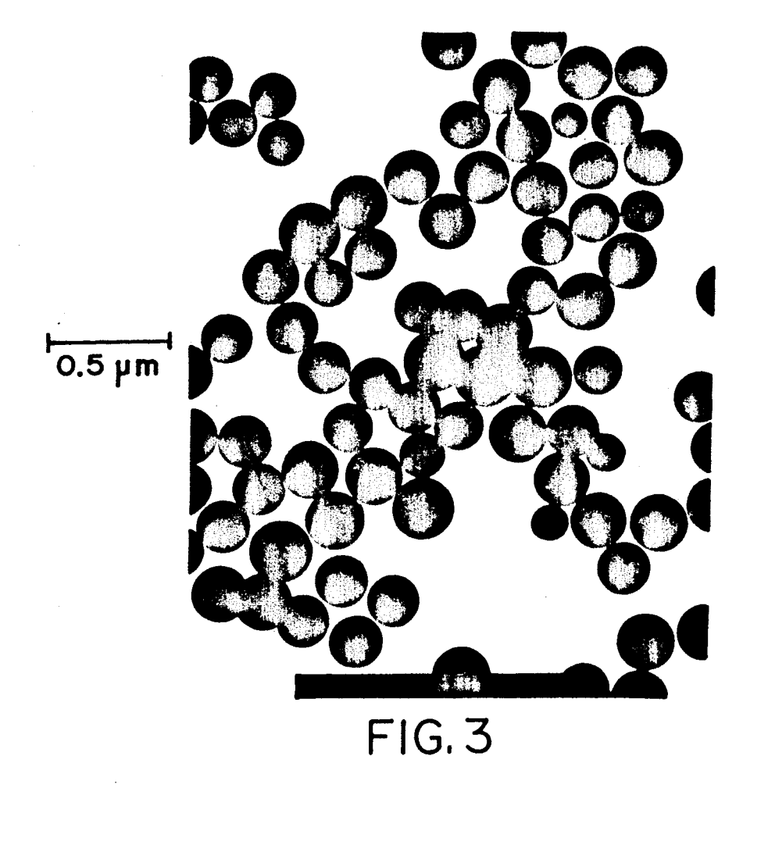
FIG. 3 is a pen and ink reproduction of a transmission electron micrograph of the terbium hydroxycarbonate of Example 2.
Figure 4:
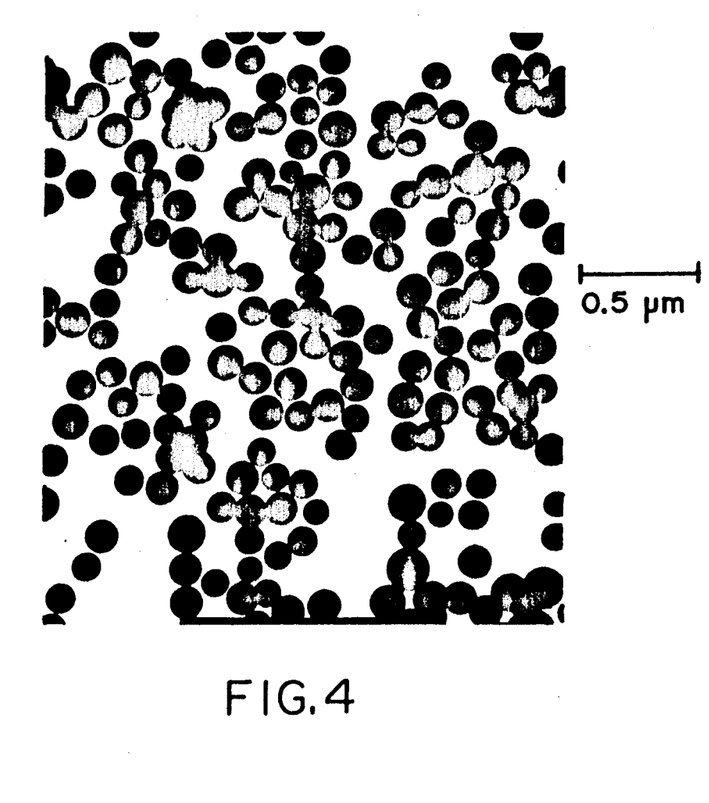
FIG. 4 is a pen and ink reproduction of a transmission electron micrograph of the europium hydroxycarbonate of Example 3.
Figure 5:
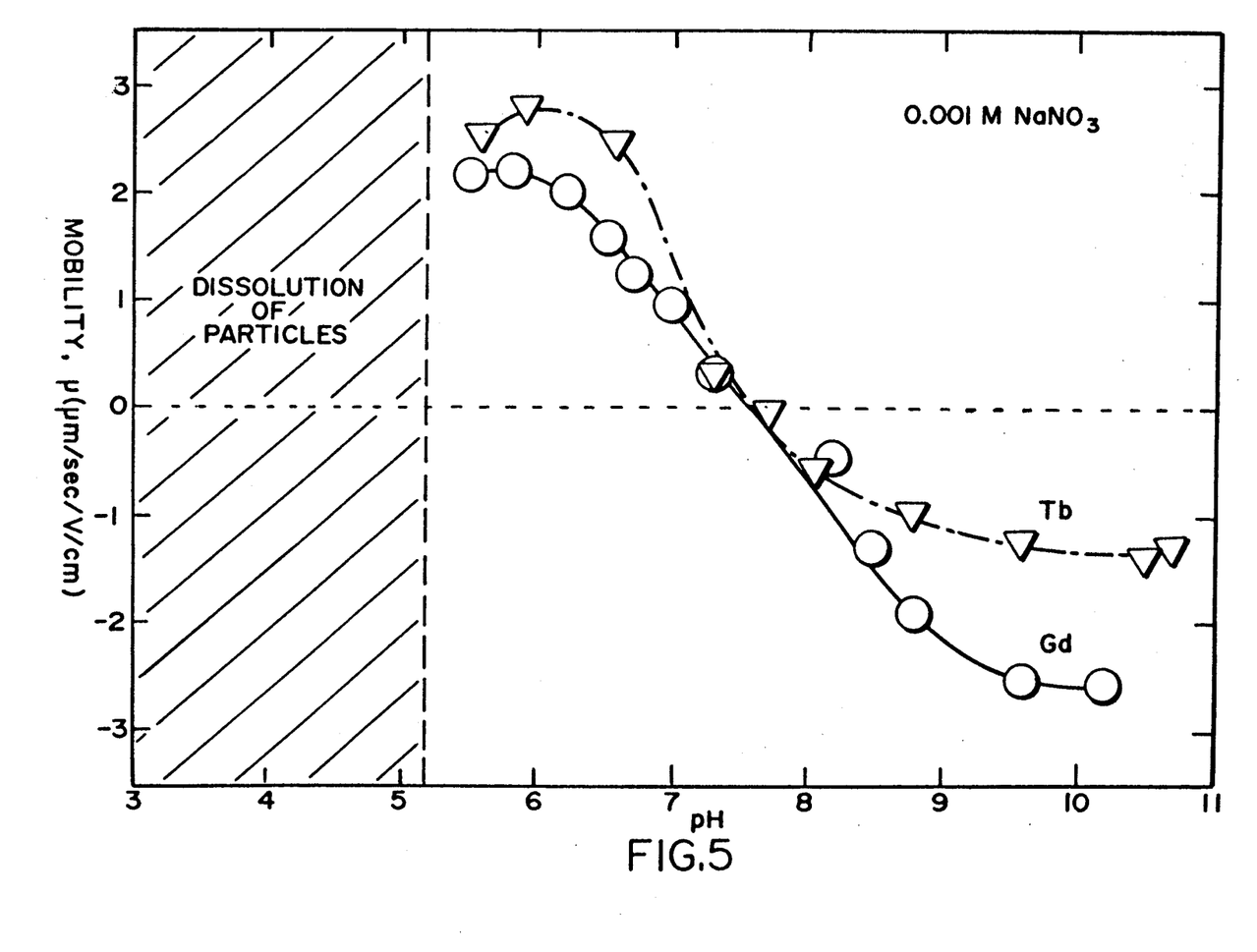
FIG. 5 is a graphical illustration of the electrokinetic measurement of gadolinium and terbium hydroxycarbonates prepared in accordance with procedures of Examples 1 and 2 respectively.
Figure 6:
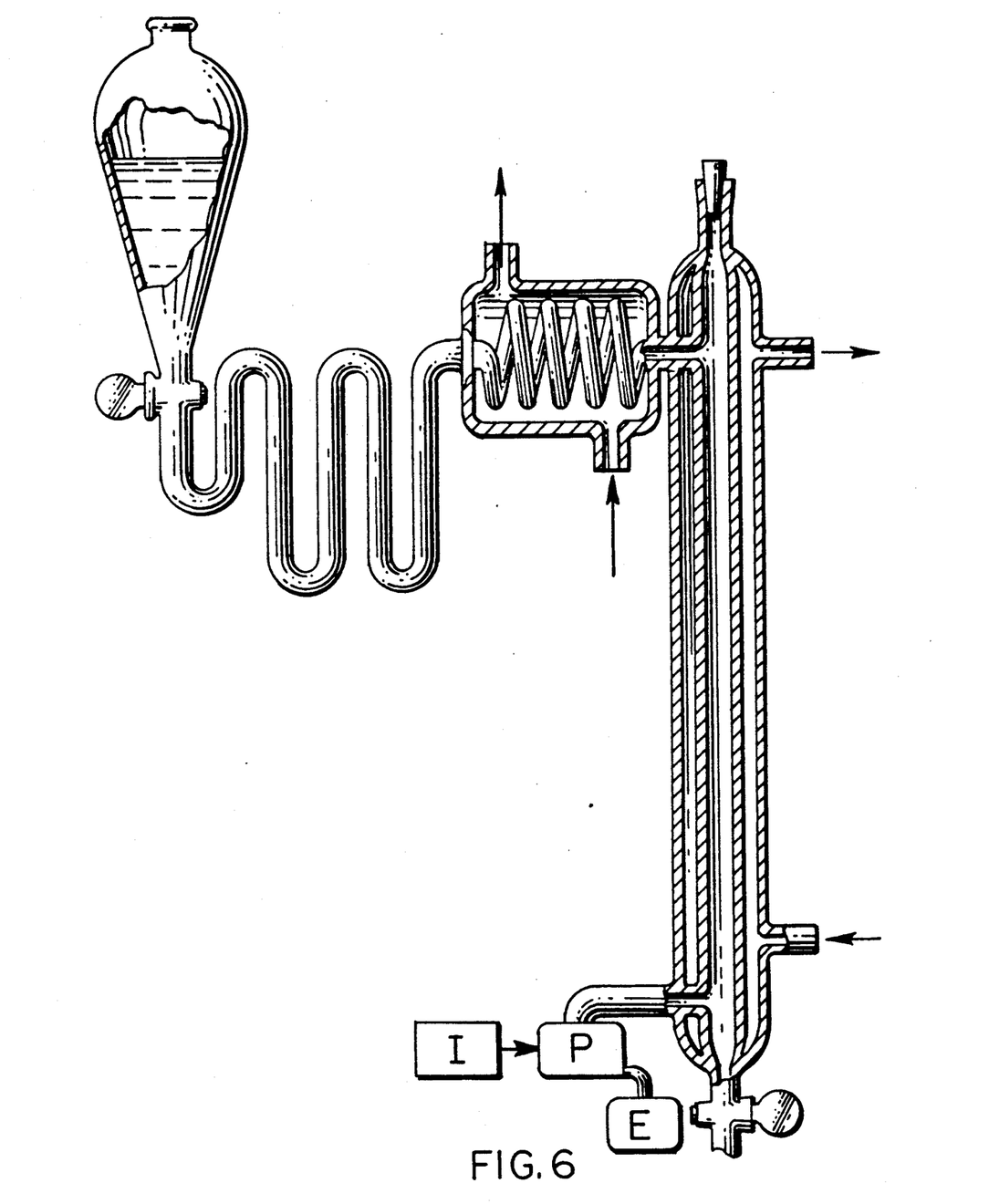
FIG. 6 illustrates an adaptation of this invention to a continuous flow process for the synthesis of colloidal particles from rare earth salts.

The laboratory scale equipment and process flow illustrated in FIG. 6 is capable of production of from about 1 to 5 grams of colloidal particles per hour. The feed stream comprising the rare earth salt, acid and organic base (optional) (in the appropriate relative proportions) is prepared in a reservoir (2). The reservoir can be a conventional separatory funnel having an opening on one end (4) thereof for the introduction of additional feedstock ("make-up" reagents), a valve (6) for metering or controlling the flow of feedstock from the funnel, and a fitting on the dispensing tip (8) of the funnel adapted to accept tubing or conduit. This conduit connects the reservoir to what can be characterized as a buffer (12). This buffer is simply a convoluted section of conduit of sufficient length to thermally isolate (i.e. buffer) the feedstock, in the separatory funnel, from a pre-heater condenser (20). The pre-heater condenser can typically include an internal heating element or simply be connected to a source of heated fluid. The residence time of the feedstock in the pre-heat condenser is controlled both by the cross-section of the conduit within the condenser and the flow rate. The feedstock, which is withdrawn from, or exits, the pre-heat condenser, has been heated in the pre-heat condenser to essentially the same temperature as the reactor column. By the time the feedstock is withdrawn from the pre-heat condenser, the formation of precursor (nuclei) of the colloidal particles has been essentially completed.

The further reaction of the constituents (solute) of feedstock and the pre-formed nuclei now proceeds to the degree desired in the reactor column (30). The volume of the reactor column relative to the pre-heat condenser is maintained at a ratio of about 10:1 to provide adequate "aging" of reactants and controlled particle growth. The flow, or residence time, of materials through the reactor is controlled by a pump which draws materials from a side arm (24) near the base of the reactor. The pump, in this illustration, is peristaltic in operation. The rate at which the pump operates is, in turn, controlled by a timer (32).

In a specific embodiment of the continuous flow process of the type illustrated in FIG. 6, the pre-heat condenser had a capacity of 8 cubic centimeters and the reactor, a capacity of 80 cubic centimeters. In this specific embodiment of this process, the residence time of the nuclei in the reactor was on the order of about 40 minutes or less, depending upon the size of particle desired. In order to achieve this residence time, fluid was withdrawn from the side arm near the bottom of the reactor, at a rate of about 2 cubic centimeters per minute (120 cc/hour). This flow rate insured a continuous production of 1 to 5 grams of colloidal particles per hour.

During this accelerated aging process within the reactor, particle growth continued essentially uninterrupted, with the larger particles forming progressively, and collecting toward the bottom of the reactor (due to their relatively longer residence time within the reactor). These particles did, however, remain in stable suspension and could be readily withdrawn from the reactor and concentrated by conventional techniques. If desired, these particles could be dried and stored as powders.

Because of the stability of dispersions of these colloidal particles in fluid (aqueous) media, it is possible to utilize relatively simple photo-optical technique for the characterization of a number of their physical properties (e.g., electrophoretic mobility of particles in fluids can be used to determine surface charge characteristics, which in turn can be translated into "zeta" potential for the specific material). In addition to determination of the suspended particles surface charge, photo-optical measurements can be used to obtain both particle size and size distribution; photo responsiveness (i.e. fluorescence); and refractive index.

EXAMPLES

The following materials and procedures were used in the preparation of the novel monodispersed particles of this invention. Parts and percentages appearing is such examples are by weight unless otherwise stipulated. Equipment and techniques utilized in this process and in the evaluation or characterization of the colloidal particles derived from this process are standard (if unspecified) unless stated otherwise.

I. Synthesis Procedures

The preparation of colloidal particles from rare earth salts is accomplished utilizing standard laboratory equipment and techniques. The reactants, typically solutes, were initially dissolved in a common solvent (water) in a common reaction vessel; the pH of the solution adjusted to the appropriate value; and, the solution thereafter heated in a closed loop reactor for the desired reaction interval. The reaction temperature and pH were carefully monitored in order to insure their maintenance within prescribed limits.

II. Characterization of Physical Properties

The colloidal particles prepared by the process of this invention can be separated from the fluid media and dried. The structure of these particles was studied by x-ray diffraction analysis, using a Phillips diffractometer; particle sizing performed by standard light scattering polarization-ratio method (particles dispersed in fluid); and by scanning electron microscopy (dry powders). The surface charge characterization was determined by electrokinetic measurements on a PenKem 3000 System, and the chemical surface composition identified by classical chemical analytical procedures and IR spectroscopy (Perkin-Elmer 1430 recording infrared spectrophotometer). A Perkin-Elmer LS-5 fluorescence spectrophotometer was used for fluorescence studies on rare earth colloidal particle dispersions. Multipoint BET gas absorption techniques (Quantasorb equipment, having a linear flow controller) were used for determinations of specific surface area.

EXAMPLE 1

Synthesis of Spherical Colloidal Particles of Gadolinium Hydroxycarbonate (a) A colloidal dispersion was prepared in accordance with the above Synthesis Procedures utilizing the following materials and under the following conditions:

$GdCl_3$: $6 \times 10^{-3}$ mol $dm^{-3}$
Urea: 0.5 mol $dm^{-3}$
Initial pH: ~5
Temperature: 85° C.

The resultant colloidal particles have a modal particles diameter of 0.2 micrometers after 30 minutes of aging and 0.6 micrometers after 120 minutes of aging.

(b) A second colloidal dispersion was prepared in accordance with the above Synthesis Procedures utilizing the following materials and under the following conditions:

$GdCl_3$: $6 \times 10^{-3}$ mol $dm^{-3}$
Urea: 0.2 mol $dm^{-3}$
pH: 4.6
$H_2SO_4$: $1 \times 10^{-4}$ mol $dm^{-3}$
Temperature: 85° C.

The resultant colloidal particles have a modal diameter of 0.1 micrometers after 30 minutes of aging and 0.2 micrometers after 120 minutes of aging. The effects of increased acidity upon particle size is predictive since deprotonation of the rare earth hydrate is retarded at lower pH.

The physical properties of the colloidal particles prepared in accordance with this example were determined in the aforedescribed manner. The particles thus obtained were confirmed to be amorphous in character and of a narrow particles size distribution. These particles were fluorescent at the wave lengths specified in Table I. Calcination of these powders at temperatures in the range of from about 300° to 850° C., resulted in their crystallization, a weight loss of approximately thirty percent (30%), conversion to the corresponding (hydrous) oxide, and an increase in porosity. The surface area, however, remained essentially the same (3 $m^2$/gram), nor was there any change in the specific surface area. The particles remained redispersible in aqueous media. The refractive index of these particles (at 546 and 436 nm) was approximately 1.8.

EXAMPLE 2

Synthesis of Terbium Hydroxycarbonate (a) A colloidal dispersion was prepared in accordance with the above Synthesis Procedures utilizing the following materials and under the following conditions:

$TbCl_3$: $6 \times 10^{-3}$ mol $dm^{-3}$
Urea: $4 \times 10^{-1}$ mol $dm^{-3}$
Initial pH: ~5.5
Temperature: 85° C.
Aging Time: 1 hour
Particle Size (modal diameter): 0.25 micrometers

EXAMPLE 3

Synthesis of Europium Hydroxycarbonate (a) A colloidal dispersion was prepared in accordance with the above Synthesis Procedures utilizing the following materials and under the following conditions:

$EuCl_3$: $6 \times 10^{-3}$ mol $dm^{-3}$
Urea: 1.6 mol $dm^{-3}$
Initial pH: 5.3
Temperature: 85° C.
Aging Time: 1 hour
Particle Size: 0.15 micrometers The colloidal particles produced under theses conditions had a modal diameter of 0.2 micrometers and the standard deviation, 0.05 micrometers.

EXAMPLE 4

Synthesis of Samarium Hydroxycarbonate (a) A colloidal dispersion was prepared in accordance with the above Synthesis Procedures utilizing the following materials and under the following conditions:

$Sm(NO_3)_3$: $6 \times 10^{-3}$ mol $dm^{-3}$
Urea: $0.5 \times 10^{-1}$ mol $dm^{-3}$
pH: ~5.5
Temperature: 85° C.
Aging Time: 1 hour
Particle Size (modal diameter): 0.25 micrometers

TABLE I

The fluorescence emission spectra of samples of gadolinium (III), europium (III), and terbium (III) hydroxycarbonates were measured with a Perkin-Elmer LS-5 fluorescence spectrophotometer. Enhanced emission spectra of the samples in aqueous solutions were observed as the excitation wavelength (e.w.) is smaller than 546 nm. The spectra of the different samples are similar to each other at excitation wavelengths other than 230 nm. The results are tabulated as follows:

| e.w./nm | Emission Spectra/nm |
| --- | --- |
| 230 | 330–410, 500 (s.p.) 550 (only for Tb) |
| 265 | 291 (s.p.), 580 (s.p.) |
| 290 | 321 (s.p.), 330–400, 643 (s.p.) |
| 360 | 410 (s.p.) |
| 394 | 454 (s.p.), 591 (s.p.) |
| 436 | 470 (s.p.), 512 (s.p.), 654 (s.p.) |
| 488 | 510 (s.p.), 531 (s.p.), 733 (s.p.) |
| 546 | 590–605 |
| 590 | 610–620 (weak band) |
| 633 | 650–660 (weak band) | s.p. = sharp peak

EXAMPLE 5

One milliliter of a 10% (w/w) aqueous suspension of gadolinium oxide is initially washed with methanol (×3). The oxide is once again washed with methylene chloride (×3) and thereafter contaced (×3) with a series of methylene chloride solutions containing 1% polystyrene (w/v), thereby imparting a polymer coating (deposit) upon the particle's surface. The coated particles are washed once again with alternating solutions of methanol and water in a sonicator. The particles are separated from the final wash fluid by centrifugation and resuspended in sufficient volume of a phosphate buffered saline to form a 10% (w/v) suspension. Monoclonal antibody specific for a T-cell surface (lymphocyte phenotype) marker are adsorbed onto the polystyrene coated gadolinium oxide particles by simply contacting said particles and antibody in the buffered saline solution. The concentrations of antibody added to the particle suspension is approximately 1 mg/ml. The antibody coated particles are now mixed with a solution of bovine serum albumin (1 mg/ml) to block non-specific binding sites on the particles. The antibody coated particles prepared in the above manner are now ready for use or can be stored under refrigeration for use at a later time.

EXAMPLE 6

An aliquot of a fluid suspension of antibody coated gadolinium oxide particles (prepared in accordance with Example 5) is combined with a highly diluted sample of whole blood (the extent of dilution being dictated by the analytical protocol of the analytical instrument). The colloidal particles and sample are swirled to insure essentially uniform distribution of the materials of the resultant dispersion. After a relatively brief interval (<15 seconds), the dispersion is transferred to a sample containers and the container inserted into an EPICS Model C Flow Cytometer (available from the Epics Division of Coulter Corporation, Hialeah, Fla.). The sample is processed in accordance with standard flow cytometer photo-optical principles. Sample excitation is achieved with ultraviolet light (excitation at 365 nm). The scattergram produced by such analysis permits ready identification and differentiation of the subset of cells of the lymphocyte population which had been tagged with the flourescent gadolinium oxide particles.

What is claimed is:

1. In a process for the preparation of colloidal particles from rare earth salts by homogeneous precipitation techniques involving the forced hydrolysis of a hydrated cation at elevated temperatures, the improvement comprising:

(a) providing an aqueous solution, at an initial pH in the range of from about 4.5 to about 6, containing one or more hydrated rare earth cations;

(b) heating the aqueous solution containing one or more hydrated rare earth cations to a temperature in the range of from about 70° to about 90° C., so as to effect deprotonation of the hydrated rare earth cations under conditions conducive to control over the kinetics of formation of a precursor of the colloidal particles, and thereby generate in single burst of nuclei preliminary to formation of colloidal particles;

(c) aging the solution, in step (b) the extent of such aging being based upon the growth of said nuclei to the desired particle size for the colloidal particles; and (d) separating the colloidal particles from the solution in step (c) upon attainment of the particles of the desired particle size.

2. The process of claim 1, wherein the source of rare earth cation is a salt which is selected from the group consisting of gadolinium, terbium and europium salts.

3. The process of claim 1, wherein the solution in step (b) contains a base as a source of hydroxide ions.

4. The process of claim 3, wherein the source of hydroxide ions is an organic base, said organic base thermally decomposing in said aqueous solution, at temperatures in the range of from about 70° to about 90° C., to produce a deprotonation accelerator effective amount of hydroxide ions.

5. The process of claim 4, wherein the precursor to colloidal particle formation is generated in solution at supersaturation concentrations and under conditions so that only a single burst of particle forming nuclei occurs.

6. The process of claim 4, wherein the aqueous solution containing one or more hydrated rare earth cations is acidified so as to increase the size of colloidal particle without extended aging, the acid conscentration of said solution being, at all times, maintained below about $1 \times 10^{-2}$ mol dm$^{-3}$.

7. The process of claim 1, wherein the concentration of rare earth salt in solution is in the range from about $1 \times 10^{-3}$ mol dm$^{-3}$ to about $2 \times 10^{31\ 2}$ mol dm$^{-3}$.

8. The process of claim 3, wherein the colloidal particles are heated under conditions conducive to decomposition of organic matter, while preserving the colloidal characteristic of said particles.

9. The process of claim 1, wherein said rare earth salts used are rare earth nitrates and halides.

* * * * *